United States Patent
Chang et al.

(10) Patent No.: US 8,113,485 B2
(45) Date of Patent: Feb. 14, 2012

(54) LEAK-PROOF STRUCTURE OF OIL PIPE CONNECTOR

(75) Inventors: Ching-Ching Chang, Taipei (TW); Ying-Ying Chang, Taipei (TW); Li-Jen Chang, Taipei (TW)

(73) Assignee: Bison, Inc., Taoyuan County (TW)

( * ) Notice: Subject to any disclaimer, the term of this patent is extended or adjusted under 35 U.S.C. 154(b) by 488 days.

(21) Appl. No.: 12/320,389

(22) Filed: Jan. 26, 2009

(65) Prior Publication Data

US 2010/0187807 A1    Jul. 29, 2010

(51) Int. Cl.
*F16K 31/44* (2006.01)
(52) U.S. Cl. ...... 251/214; 251/99; 251/148; 137/614.06
(58) Field of Classification Search ............ 251/95, 251/96, 98, 99, 145, 148, 214, 321, 326, 251/242, 423; 137/614.06
See application file for complete search history.

(56) References Cited

U.S. PATENT DOCUMENTS

| | | | | |
|---|---|---|---|---|
| 4,693,268 A | * | 9/1987 | Fahl | 137/219 |
| 4,813,449 A | * | 3/1989 | Fahl | 137/219 |
| 5,005,602 A | * | 4/1991 | Fahl | 137/219 |
| 5,127,428 A | * | 7/1992 | Fahl | 137/219 |
| 5,407,175 A | * | 4/1995 | Roberts et al. | 251/148 |
| 5,622,201 A | * | 4/1997 | Chang | 137/219 |
| 6,202,668 B1 | * | 3/2001 | Maki | 251/214 |
| 2001/0032951 A1 | * | 10/2001 | Stewart | 251/214 |

* cited by examiner

Primary Examiner — John Fristoe, Jr.
Assistant Examiner — Seth Faulb
(74) Attorney, Agent, or Firm — Muncy, Geissler, Olds & Lowe, PLLC

(57) ABSTRACT

A leak-proof structure of an oil pipe connector includes: a connector cylinder, being a hollow housing, and having an oil inlet at a front end, and an oil outlet at a rear end, and a switch base interconnected to a shaft hole in the connector cylinder; a control device, installed in the connector cylinder; a switch device, having a transmission shaft, inserted into the shaft hole and linked with the control device, and a switch handle coupled to the top of the transmission shaft; a leak-proof device, having a bearing slot below the shaft hole, and a first leak-proof slot, a circular latch slot and a second leak-proof slot above the leak-proof device, and a bearing being disposed below the bearing slot, and a first O-ring, and a latch ring, a second O-ring for achieving a leak-proof effect.

10 Claims, 7 Drawing Sheets

LEAK-PROOF STRUCTURE OF OIL PIPE CONNECTOR

BACKGROUND OF THE INVENTION

1. Field of the Invention

The present invention relates to an oil pipe connector structure, and more particularly to an improved leak-proof structure of an oil pipe connector connected to an oil pipe of a gas station for providing a better leak-proof effect and improving the life and safety of using the oil pipe connector.

2. Description of the Related Art

With reference to FIG. 1, present existing gas stations generally have a fuel oil storage tank for storing fuel oil (such as petroleum) and supplying the fuel oil to users who need the fuel oil anytime, and thus it is necessary to refill the fuel oil when the level of fuel oil in the fuel oil storage tank is low. In general, a tanker truck is driven to a location of a gas filling equipment of the fuel oil storage tank for the refill, and the tanker truck 100 has an oil pipe connector 80. During a refill operation, the oil pipe connector 80 is connected to an incoming oil pipe 104 of the fuel oil storage tank 103, and a switch handle 86 of the oil pipe connector 80 is operated to allow the fuel oil in the tanker truck 100 to pass from the fuel oil storage tank 103 through the oil pipe connector 80

With reference to FIG. 2 for a conventional oil pipe connector, the oil pipe connector 80 comprises a hollow connector cylinder 81, having a switch base 82 interconnected with a shaft hole 83 inside the connector cylinder 81, a bearing slot 831, a leak-proof slot 832 and a circular latch slot 833 with increasingly larger diameter installed from top to bottom and disposed inside the shaft hole 83, and the shaft hole 83 having a transmission shaft 84 corresponding to the bearing slot 831, and both leak-proof slot 832 and circular latch slot 833 having a bearing 841, an O-ring 842A, a spacer ring 842B and a latch ring 843, and the top of the transmission shaft 84 being coupled to a switch handle 86 having a connected torque spring 85, and the switch handle 86 being normally pressed and positioned by a positioning pillar 87. In an operation of filling fuel oil, the switch handle 86 is pressed downward, such that the switch handle 86 is released from the positioning pillar 87, and the switch handle 86 is pushed to the rear end to rotate the transmission shaft 84, and link related components (not shown in the figure) in the connector cylinder 81, and open an oil outlet in the connector cylinder 81 for filling and storing fuel oil. Since the shaft hole 83 is interconnected with the interior of the connector cylinder 81, a leak-proof design at the shaft hole 83 becomes extremely important. Although this prior art has an O-ring 842A and a spacer ring 842B installed at the leak-proof slot 832 to seal any possible leaking gap, the rotation of the transmission shaft 84 wears out the O-ring 842A and the spacer ring 842B after a short period of time, and the O-ring 842A and the spacer ring 842B gradually lose their leak-proof function and thus oil leaks may occur. If the oil pipe connector 80 leaks, the gas station will be contaminated and there is also a potential high risk. Furthermore, the oil pipe connector 80 requires maintenance and replacement frequently, and thus a higher maintenance cost is incurred. Therefore, it is an important subject for the related industry to overcome the shortcomings of the conventional oil pipe connector and solve leak issue.

In view of the foregoing shortcomings of the prior art, the inventor of the present invention conducted extensive researches and experiments, and finally developed a New Type leak-proof structure of an oil pipe connector in accordance with the present invention to overcome the shortcomings of the prior art and promote the development of the related industry.

SUMMARY OF THE INVENTION

It is a primary objective of the present invention to provide a New Type leak-proof structure of an oil pipe connector for enhancing the leak-proof function and the life of the oil pipe connector, reducing maintenance cost, and improving cost-effectiveness and safety.

To achieve the foregoing objective, the present invention adopts a technical measure comprising: a connector cylinder, being a hollow housing, and having an oil inlet at a front end of the connector cylinder, an oil outlet at a rear end of the connector cylinder, and a switch base having an shaft hole interconnected to the interior of the connector cylinder; a control device, installed in the connector cylinder; a switch device, including a transmission shaft and a switch handle, and the transmission shaft being pivotally inserted into the shaft hole and linked with the control device, and the switch handle being coupled to the top of the transmission shaft; a leak-proof device, including a bearing slot below the shaft hole, and the bearing slot having a first leak-proof slot, a circular latch slot and a second leak-proof slot installed sequentially above the bearing slot, and a bearing being installed at the position of the bearing slot, and a first O-ring being installed at the position of the first leak-proof slot, and a latch ring being installed at the position of the circular latch slot, and a second O-ring being installed at the position of the second leak-proof slot, for achieving a very good leak-proof effect.

To make it easier for our examiner to understand the technical characteristics and effect of the present invention, we use preferred embodiments with accompanying drawings for the detailed description of the invention as follows:

DETAILED DESCRIPTION OF THE PREFERRED EMBODIMENTS

Figure 1:
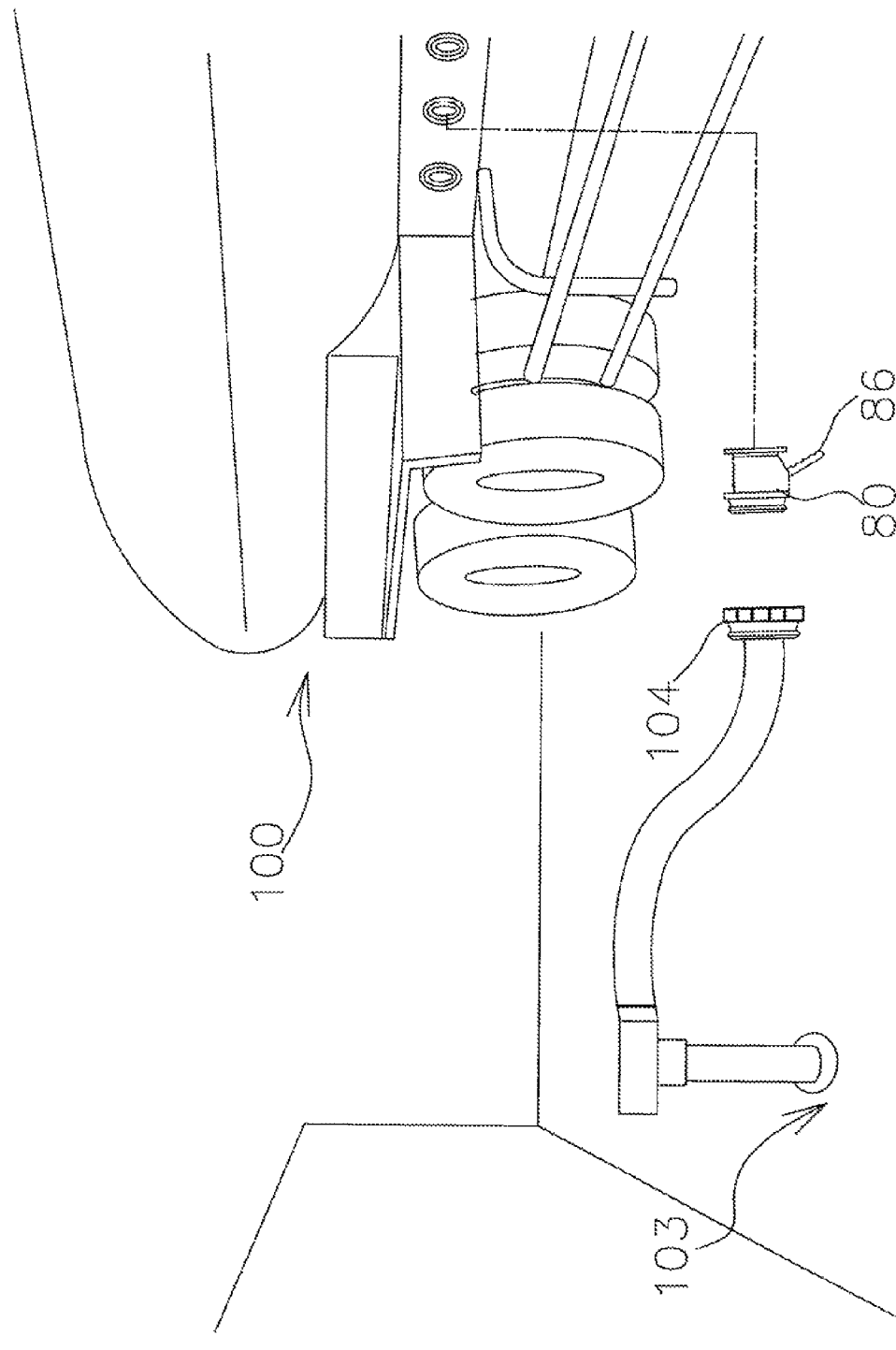
FIG. 1 is a schematic view of filling oil from a tanker truck in accordance with a prior art.
Figure 2:
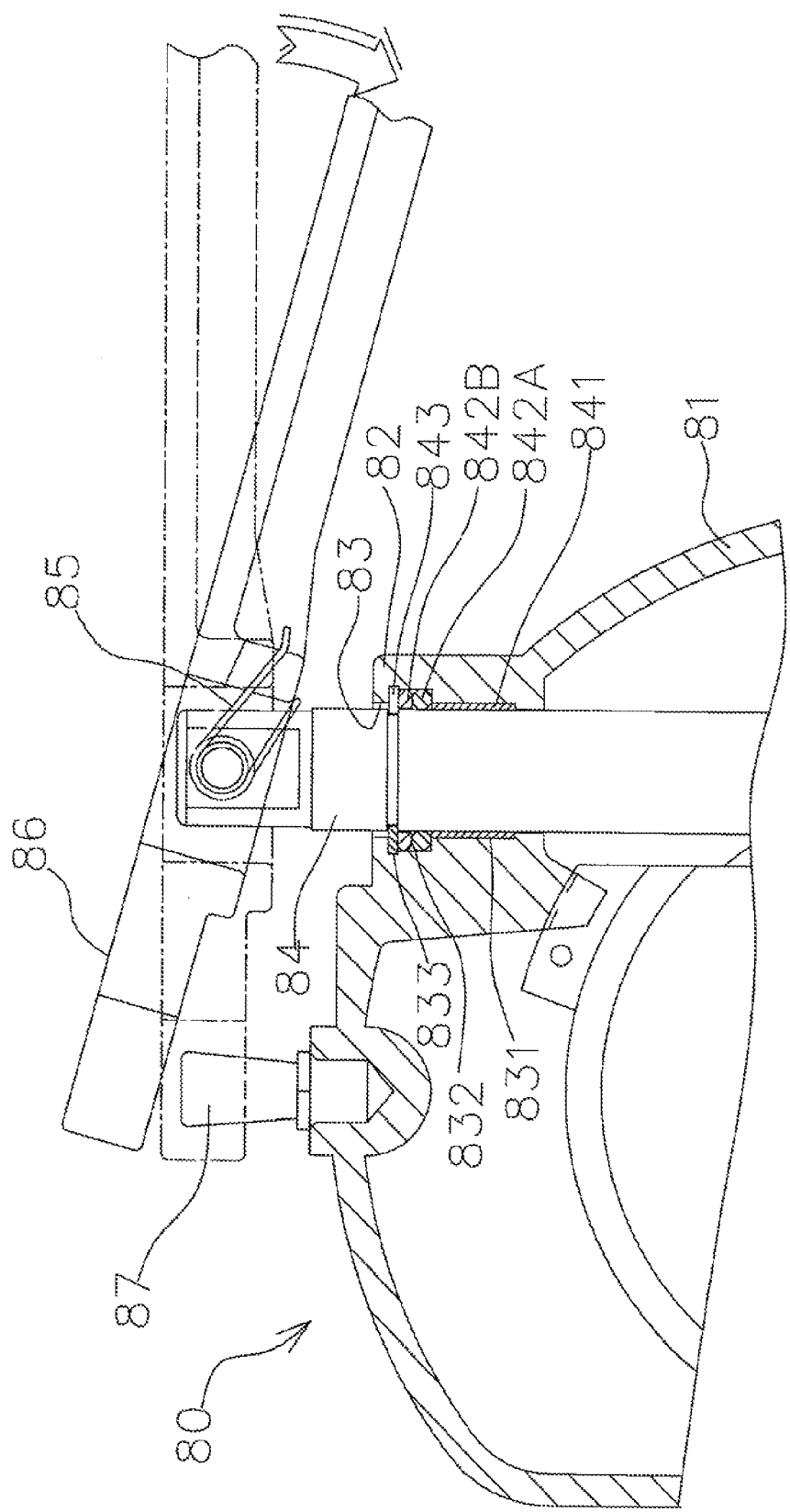
FIG. 2 is a schematic view of a portion of a conventional oil pipe connector.
Figure 3:
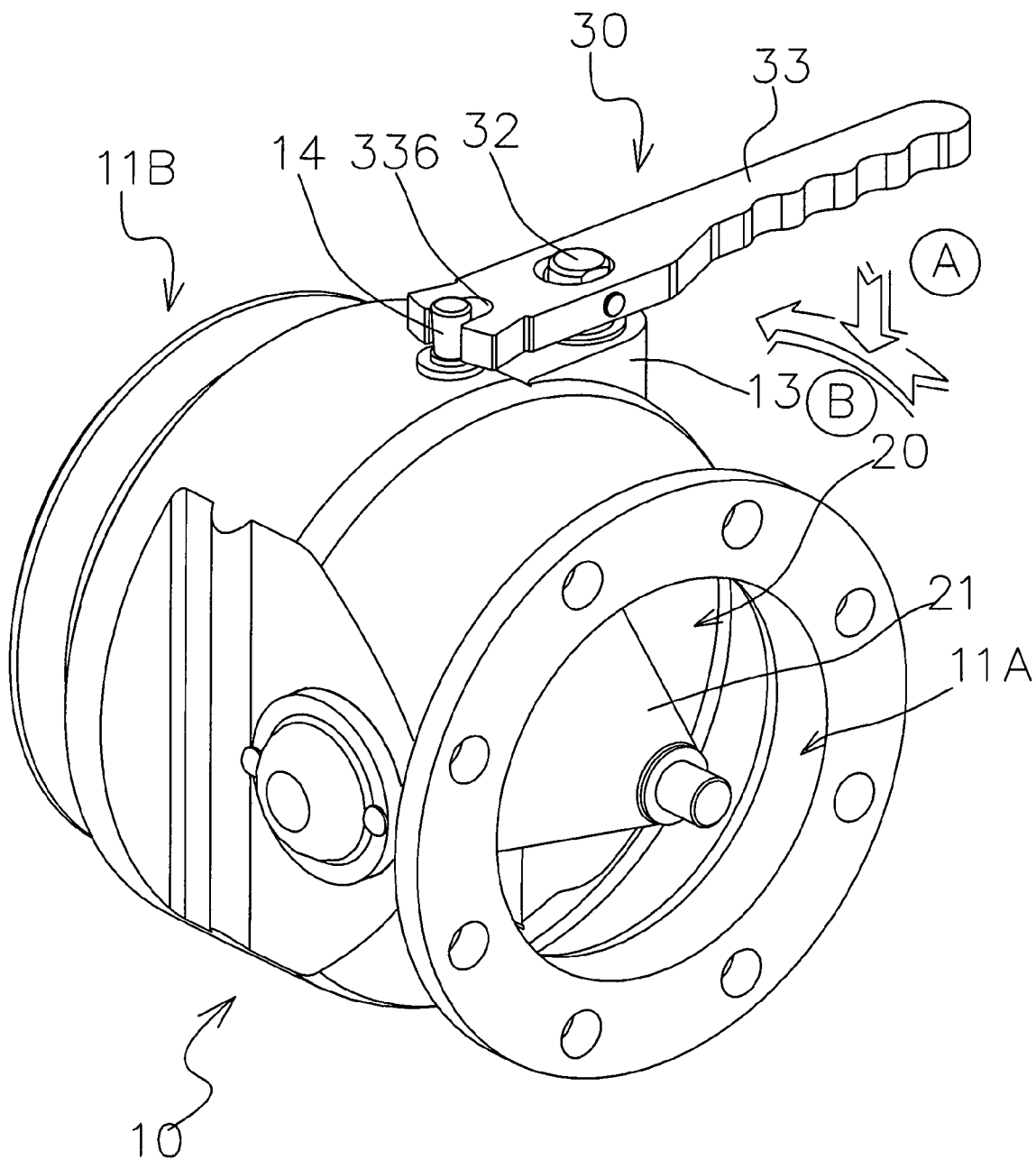
FIG. 3 is a perspective view of the present invention.
Figure 4:
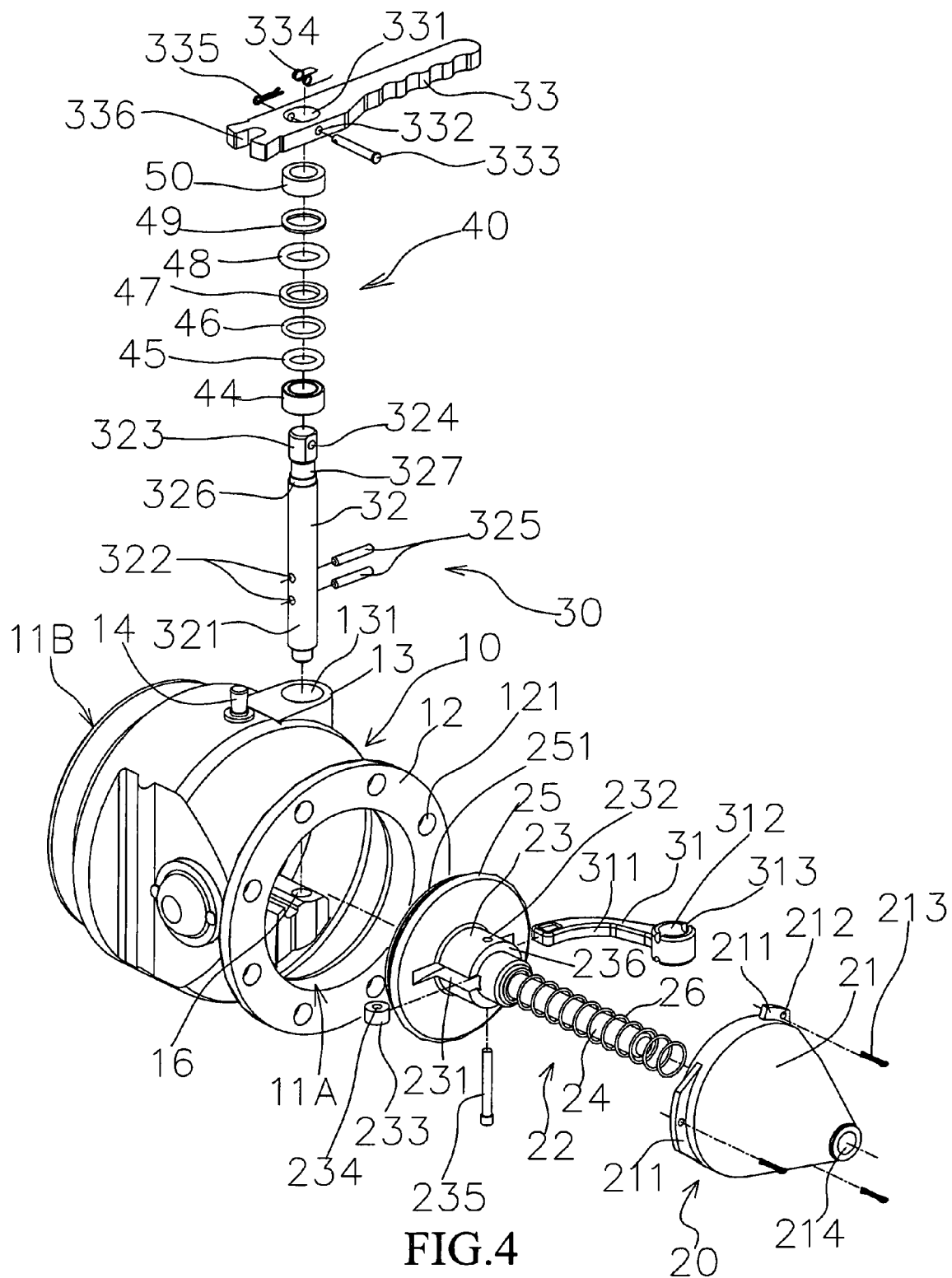
FIG. 4 is an exploded view of the present invention.
Figures 5, 5A:
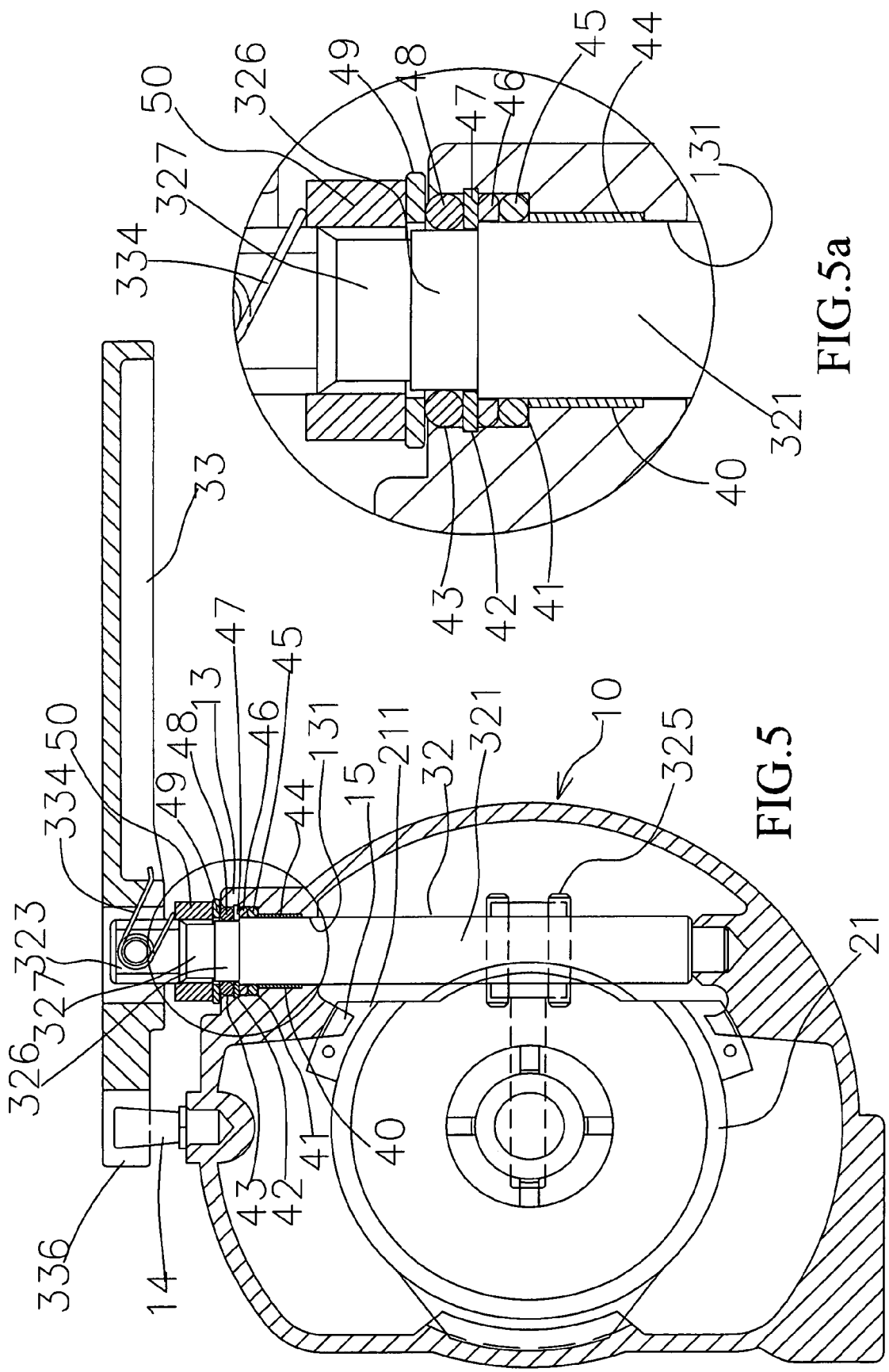
FIG. 5 is a cross-sectional view of the present invention.
FIG. 5a is a partial enlargement view of FIG. 5.

With reference to FIGS. 3 to 5 for an New Type leak-proof structure of an oil pipe connector, the structure comprises: a connector cylinder 10, a control device 20, a switch device 30 and a leak-proof device 40, wherein the connector cylinder 10 is a hollow housing having an oil inlet 11A at its front end and an oil outlet 11B at its rear end, and a front end of the connector cylinder 10 includes a pressing rim 12 having a plurality of positioning holes 121 for fixing an oil pipe outlet of a tanker truck (not shown in the figures), and an outer side of the connector cylinder 10 includes a switch base 13 having a shaft hole 131 interconnected with the interior of the connector cylinder 10, and a positioning pillar 14 is protruded from a side of the connector cylinder 10 and at a position corresponding to the switch base 13, and the connector cylinder 10 includes a positioning shaft slot 16 disposed therein and corresponding to the switch base 13. The connector cylinder 10 further includes a plurality of positioning slot portions 15 protruded from the middle of the interior of the connector cylinder 10 (as shown in FIG. 5).

Figure 6:
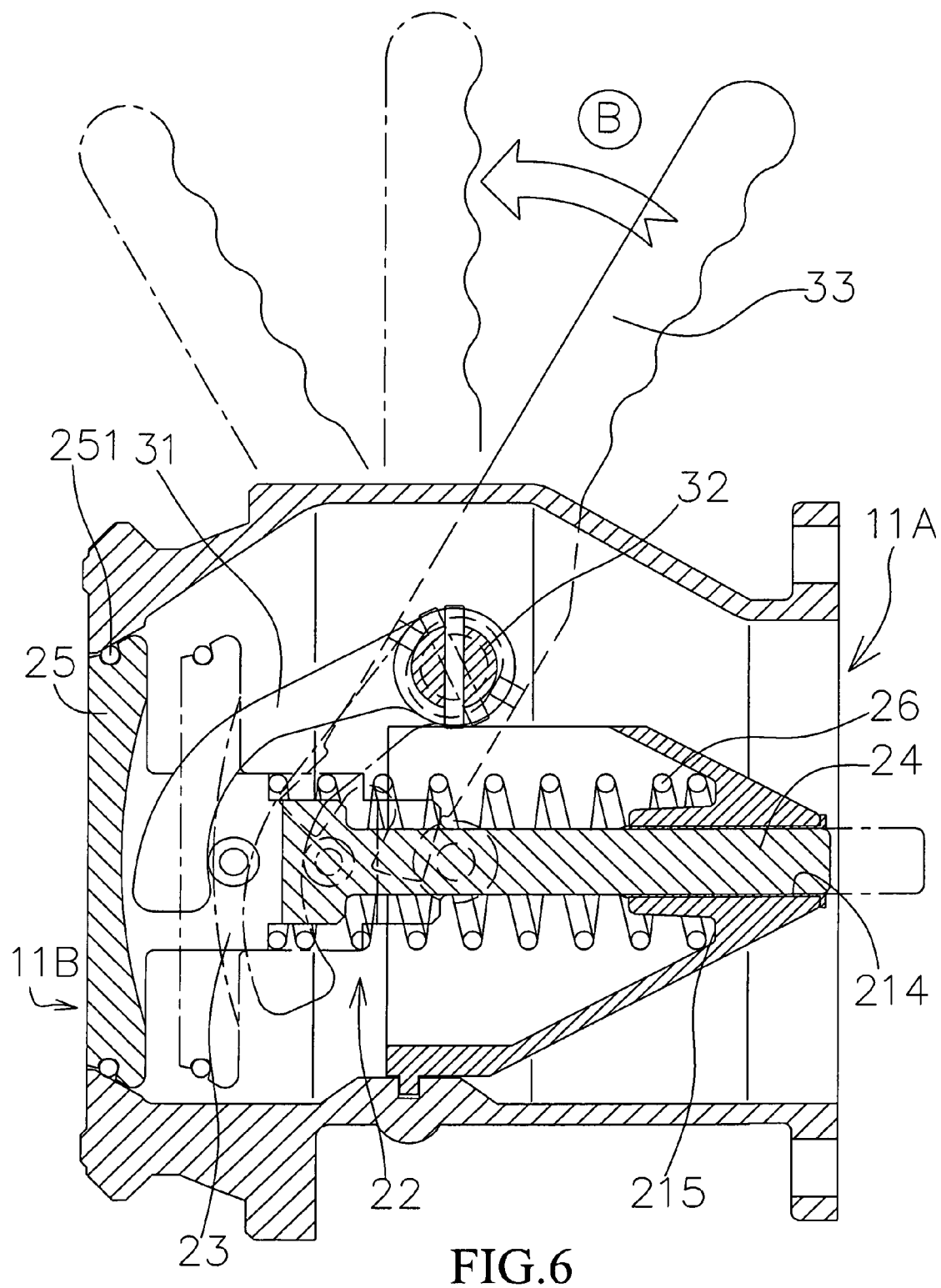
FIG. 6 is a schematic view of operating the present invention.

The control device 20 comprises a connector cap 21 and a control mechanism 22, and the connector cap 21 is in a hollow conical shape, and a front end of the connector cap 21 is interconnected with a positioning shaft hole 214 therein, and the periphery of the rear end of the connector cap 21 has a plurality of outwardly extended fixing plates 211, and the fixing plate 211 has a pivot hole 212 and is embedded into a positioning slot portion 15 of the connector cylinder 10, and a pin 213 is passed through the pivot hole 212 of the fixing plate 211 for positioning the connector cap 21 in the connector cylinder 10. The interior of the connector cap 21 contains an inner press ring 215 disposed at the outer periphery of the positioning shaft hole 214 (as shown in FIG. 6).

The control mechanism 22 includes a connecting portion 23, a positioning shaft 24 and a piston disc 25 coupled with each other, and the middle position of the connecting portion 23 includes a cut groove 231 penetrating through the connecting portion 23, and an external side of the connecting portion 23 includes a pivotal connecting hole 232 perpendicularly interconnected with the cut groove 231, and the cut groove 231 contains a rolling member 233, and the rolling member 233 is substantially a wheel having a pivot hole 234 at the central position of the wheel, such that a positioning pivot 235 is passed through the pivotal connecting hole 232 of the connecting portion 23 and the pivot hole 234 of the rolling member 233 for pivotally positioning the rolling member 233 in the cut groove 231. The connecting portion 23 further includes a ring pressing portion 236 disposed thereon, and the ring pressing portion 236 includes a spring 26, and another end of the spring 26 is abutted against an inner press ring 215 of the connector cap 21 (as shown in FIG. 6) for providing a resilience for the control mechanism 22. The positioning shaft 24 is installed to a front end of the connecting portion 23, and extended into the positioning shaft hole 214 of the connector cap 21 for positioning the control mechanism 22 and restricting the operating direction. The piston disc 25 includes a leak-proof washer 251 disposed at the outer periphery of the piston disc 25.

The switch device 30 includes a push rod 31, a transmission shaft 32 and a switch handle 33, and the push rod 31 is substantially in the shape of a curved lever and includes a curved slide surface 311, and an end of the push rod 31 is extended into the cut groove 231 of the connecting portion 23, and the curved slide surface 311 is provided for receiving the rolling member 233, and another end of the push rod 31 includes a shaft sleeve 312, and upper and lower circular surfaces of the shaft sleeve 312 include corresponding positioning slots 313. The transmission shaft 32 is inserted into and pivotally coupled to a pivot hole 131 at the switch base 13 of the connector cylinder 10, and an end of the transmission shaft 32 includes a longer driving shaft portion 321, and the driving shaft portion 321 includes two perpendicular insert holes 322, and the driving shaft portion 321 is passed through the shaft sleeve 312 of the push rod 31, and two pins 325 are passed through the positioning slot 313 of the push rod 31 and the insert hole 322 of the driving shaft portion 321 for fixing each other and integrally linking the driving shaft portion 321 and the push rod 31, and the front end of the driving shaft portion 321 is inserted and positioned into the positioning shaft slot 16 in the connector cylinder 10, and another end of the transmission shaft 32 includes a shorter connecting shaft portion 323 protruded out of the pivot hole 131, and the connecting shaft portion 323 includes a perpendicular insert hole 324. The switch handle 33 includes a connecting through hole 331 and a pin hole 332 perpendicularly interconnected with the connecting through hole 331, and the connecting through hole 331 is provided for passing the connecting shaft portion 323, and a pin 333 through the pin hole 332 and the insert hole 324, such that the switch handle 33 and the transmission shaft 32 are linked integrally. The other pin 333 in the connecting through hole 331 includes a torque spring 334, and the pin 333 at an outer side of the connecting through hole 331 includes a distal insert member 335 for positioning, and the switch handle 33 includes a concave clamping slot 336 disposed at a position corresponding to the positioning pillar 14 of the connector cylinder 10. While the concave clamping slot 336 is being clamped at the positioning pillar 14, the switch handle 33 is situated at an embedded and latched condition.

The leak-proof device 41 is coupled to the switch base 13 and the shaft hole 131 of the connector cylinder 10 and includes the bearing slot 40a disposed below the shaft hole 131 (as shown in FIGS. 5 & 5a), and a first leak-proof slot 41, a circular latch slot 42 and a second leak-proof slot 43 disposed sequentially above the bearing slot 40, and a bearing 44 is installed at the position of the bearing slot 40a, and a first O-ring 45 and a spacer ring 46 are installed at the position of the first leak-proof slot 41, and a latch ring 47 is installed at the position of the circular latch slot 42, and a second O-ring 48 is installed at the position of the second leak-proof slot 43. In addition, a pad 49 and a spacer base 50 are installed sequentially above the second O-ring 48, and the bearing 44, the first O-ring 45, the spacer ring 46, the latch ring 47, the second O-ring 48, the pad 49 and the spacer base 50 are sheathed onto the transmission shaft 32, wherein the latch ring 47 is embedded into the circular latch slot 326 of the transmission shaft 32, such that the circular latch slot 42 and the latch ring 47 are separated to make the first leak-proof slot 41, the second leak-proof slot 43, and the second O-ring 48 to be protruded slightly out from the second leak-proof slot 43, and the pad 49 is disposed across the second O-ring 48 and an upper end of the shaft hole 131, and the spacer base 50 is disposed at a position corresponding to a shaft neck portion 327 of the transmission shaft 32 and abutted by the torque spring 334.

Figure 7:
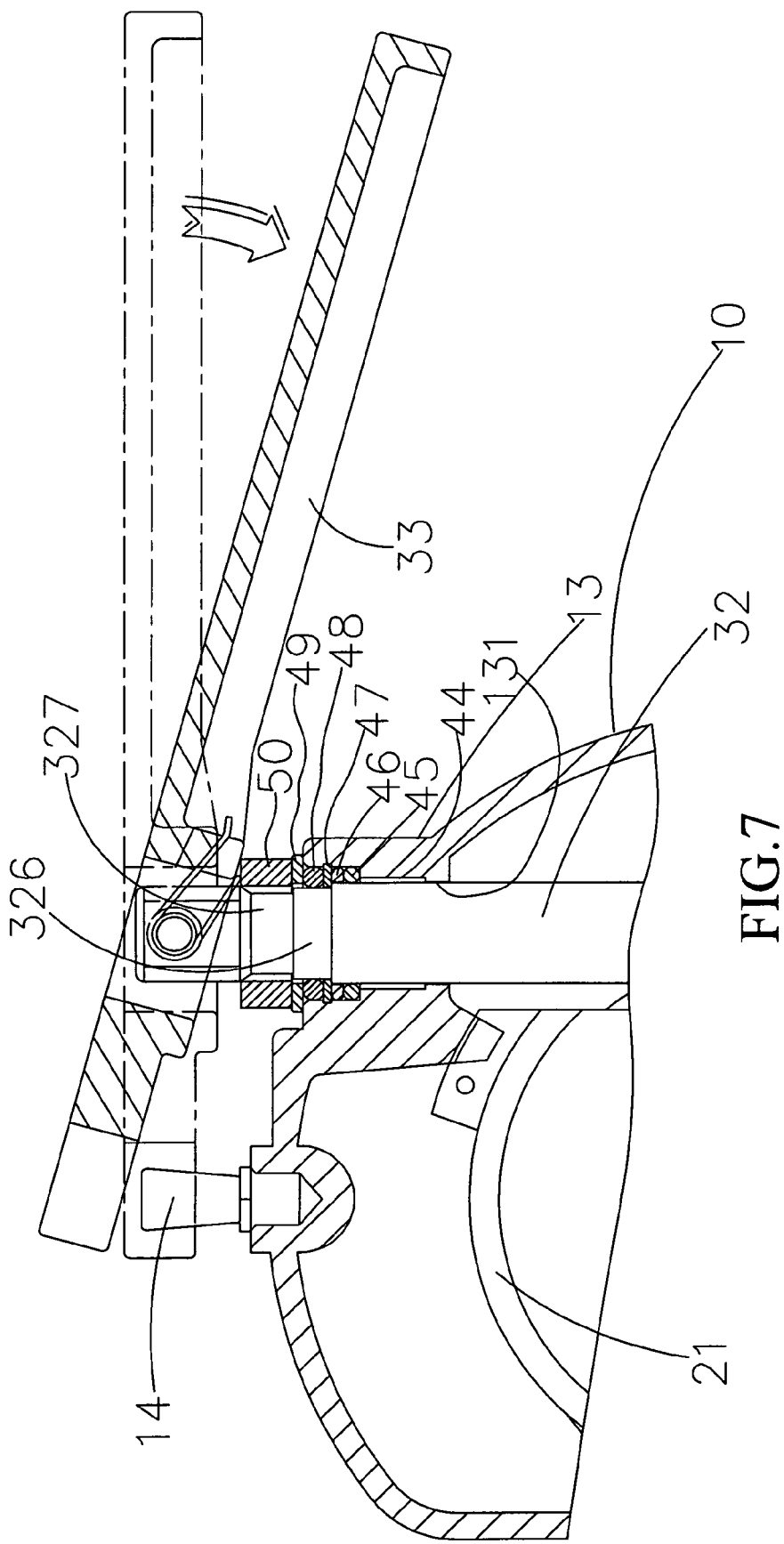
FIG. 7 is a schematic view of a leak-proof operation in accordance with the present invention.

With reference to FIGS. 6 and 7 for an oil filling operation in accordance with the present invention, the connector cylinder 10 is connected to an incoming oil pipe (not shown in the figure) of the fuel oil storage tank, and then the switch handle 33 is pressed down (in a direction A indicated by the arrow in the figures), such that an end of a concave clamping slot 336 of the switch handle 33 is lifted and released from the latch of the positioning pillar 14, and then the switch handle 33 is pushed towards the rear end (in a direction B indicated by the arrow in the figures), such that the concave clamping slot 336 of switch handle 33 is clamped and propped up the latch of the positioning pillar 14, to embed in and fix the movement of the latch of the positioning pillar 14, and meanwhile switch handle 33 link the transmission shaft 32 and push the push rod 31 forward, and finally and the control mechanism 22 is displaced and moved forward, so that the piston disc 25 releases the latch of the oil outlet 11B and allows fuel oil to enter from the oil inlet 11A into the connector cylinder 10, and then from the oil outlet 11B into the fuel oil storage tank through the incoming oil pipe to complete the oil filling operation.

In FIG. 7, if the switch handle 33 is pressed downward, the spacer base 50 and the pad 49 will also be pressed downward to deform the second O-ring 48, such that the second O-ring 48 will be plugged all the way into the second leak-proof slot 43 to completely eliminate any gap between the shaft hole 131 and the transmission shaft 32. After the fuel oil in the connector cylinder 10 is sealed by the first O-ring 45 at the first leak-proof slot 41, any slight leak (if any) will be blocked completely by the second O-ring 48 at the second leak-proof slot 43, so as to achieve a very good leak-proof effect.

In the New Type leak-proof structure of an oil pipe connector in accordance with the present invention, the leak-proof slot 43 and the second O-ring 48 are installed between the shaft hole 131 and the transmission shaft 32, and the second O-ring 48 is compressed and deformed by the spacer base 50 and the pad 49, and thus the invention can achieve the effects of improving the leak-proof function for the oil filling operation greatly, extending the life of the oil pipe connector, reducing maintenance cost, and enhancing the cost-effectiveness and safety.

While the invention has been described by means of specific embodiments, numerous modifications and variations could be made thereto by those skilled in the art without departing from the scope and spirit of this invention set forth in the claims.

What is claimed is:

1. A leak-proof structure of an oil pipe connector, comprising:
   a connector cylinder, being a hollow housing, and having an oil inlet at a front end of said connector cylinder, an oil outlet at a rear end of said connector cylinder, and a switch base having a shaft hole interconnected with the interior of said connector cylinder;
   a control device, installed in said connector cylinder;
   a switch device, including a transmission shaft and a switch handle, and said transmission shaft being pivotally inserted into said shaft hole, and linked with said control device, and said switch handle being coupled to the top of said transmission shaft;
   a leak-proof device, including a bearing slot disposed below said shaft hole, and a first leak-proof slot, a circular latch slot and a second leak-proof slot disposed sequentially upward from said bearing slot, a bearing disposed at said bearing slot, a first O-ring and a spacer ring disposed at said first leak-proof slot, a latch ring disposed at said circular latch slot, and a second O-ring disposed at said second leak-proof slot wherein said second O-ring is protruded slightly out from said second leak-proof slot, a pad and a spacer base disposed on said second O-ring, for achieving a leak-proof effect.

2. The leak-proof structure of an oil pipe connector according to claim 1, wherein said transmission shaft includes a shaft neck portion disposed at a position corresponding to said spacer base.

3. The leak-proof structure of an oil pipe connector according to claim 1, wherein said transmission shaft includes a circular latch slot disposed at a position corresponding to said latch ring.

4. The leak-proof structure of an oil pipe connector according to claim 1, wherein said pad is disposed across said second O-ring and an upper end of said shaft hole.

5. The leak-proof structure of an oil pipe connector according to claim 1, wherein said connector cylinder includes a positioning pillar protruded from a side of said connector cylinder and disposed at a position corresponding to said switch base, and said connector cylinder includes a positioning shaft slot disposed therein and at a position corresponding to said switch base, and said connector cylinder includes a plurality of positioning slot portions disposed substantially at the middle inside said connector cylinder.

6. The leak-proof structure of an oil pipe connector according to claim 1, wherein said control device includes a connector cap substantially in a hollow prism shape, and a front end of said connector cap includes a positioning shaft hole interconnected with the interior, and a plurality of fixing plates disposed at the periphery of a rear end of said connector cap, said fixing plates are embedded with said positioning slot portions of said connector cylinder, and said connector cap includes an inner press ring disposed at an outer periphery of said positioning shaft hole.

7. The leak-proof structure of an oil pipe connector according to claim 6, wherein said control device further includes a control mechanism, and said control mechanism includes a connecting portion, a positioning shaft and a piston disc coupled with each other, and said connecting portion includes a penetrating cut groove disposed at the middle of said connecting portion, and said cut groove includes a rolling member pivotally coupled to the interior of said cut groove, and said connecting portion includes a ring pressing portion thereon, and said ring pressing portion includes a spring abutted to said ring pressing portion, and another end of said spring is abutted at said inner press ring of said connector cap, and said positioning shaft is extended into said positioning shaft hole of said connector cap.

8. The leak-proof structure of an oil pipe connector according to claim 7, wherein said switch device further includes a push rod being substantially in the shape of a curved rod and having a curved slide surface, and an end of said push rod is extended into a cut groove of said connecting portion, such that said curved slide surface receives said rolling member, and another end of said push rod includes a shaft sleeve for passing and connecting said transmission shaft.

9. The leak-proof structure of an oil pipe connector according to claim 2, wherein said shaft neck portion of said transmission shaft includes a circular latch slot disposed therebelow.

10. The leak-proof structure of an oil pipe connector according to claim 8, wherein said switch handle includes a connecting through hole and a pin hole perpendicularly interconnected with said connecting through hole, and said connecting through hole is provided for passing said connecting shaft portion, and a pin is passed through said pin hole for coupling said switch handle and said transmission shaft, and said pin in said connecting through hole is abutted by a torque spring, and said torque spring is pressed at said spacer base, and said switch handle includes a concave clamping slot disposed at a position corresponding to said positioning pillar of said connector cylinder.

* * * * *